United States Patent
Hulten

[15] 3,680,903
[45] Aug. 1, 1972

[54] PROTECTIVE DEVICE
[72] Inventor: Richard E. Hulten, Dunham, N.H.
[73] Assignee: McCord Corporation, Detroit, Mich.
[22] Filed: Oct. 8, 1970
[21] Appl. No.: 79,142

[52] U.S. Cl.......................293/71 R, 49/462, 52/716
[51] Int. Cl..............................................B60r 19/08
[58] Field of Search.....293/71 R, 71 P, 54 D, 64, 65; 52/716, 717, 718; 49/490, 491, 492, 460, 462, 475; 267/139, 140; 296/93; 152/189, 190, 191, 175, 176, 226, 227, 323

[56] References Cited

UNITED STATES PATENTS

| | | |
|---|---|---|
| 3,391,669 | 7/1968 | Buster............................115/12 |
| 2,240,502 | 5/1941 | Hall................................52/716 |
| 2,275,127 | 3/1942 | Brown............................189/88 |
| 3,037,254 | 6/1962 | Holton............................24/73 |

Primary Examiner—Arthur L. La Point
Assistant Examiner—Robert Saifer
Attorney—McGlynn, Reising, Milton & Ethington

[57] ABSTRACT

A device which is adapted for ready attachment to the exposed surface of an exterior component, for example an automobile bumper, fender or the like. In addition to being decorative, the device also functions to absorb energy in the event of an impact, and to protect the surface to which it is attached from scratches, dents, etc.

4 Claims, 4 Drawing Figures

PATENTED AUG 1 1972 3,680,903

INVENTOR
RICHARD E. HULTEN

INVENTOR
RICHARD E. HULTEN

ATTORNEYS

PROTECTIVE DEVICE

DESCRIPTION OF THE INVENTION

This invention relates generally to a protective device for the exposed surface of an exterior component, for example an automobile bumper, fender, etc., and is particular concerned with a novel internal structure having improved means integral therewith for attaching the device to the aforesaid component. The invention is especially useful as a "rub strip" for an automobile bumper, although it will be appreciated from the following detailed description that other uses are also contemplated.

One of the principle objects of the present invention is to provide an improved means for attaching the device to the surface to be protected, which means is completely integral with the device and which does not materially increase the cost thereof. Another object of the invention is to provide an attaching means which does not in any way adversely affect the strength and rigidity of the protective device. A further object of the invention is to avoid the necessity of employing separate components such as for example nuts, clips etc. to attach the protective device to a given surface. Still another object of the present invention is to provide a protective device which is simple to attach and which will not subsequently loosen and rattle.

Additional objects and advantages of the present invention will become more apparent as the description proceeds with the aid of the accompanying drawings wherein.

Figure 1:
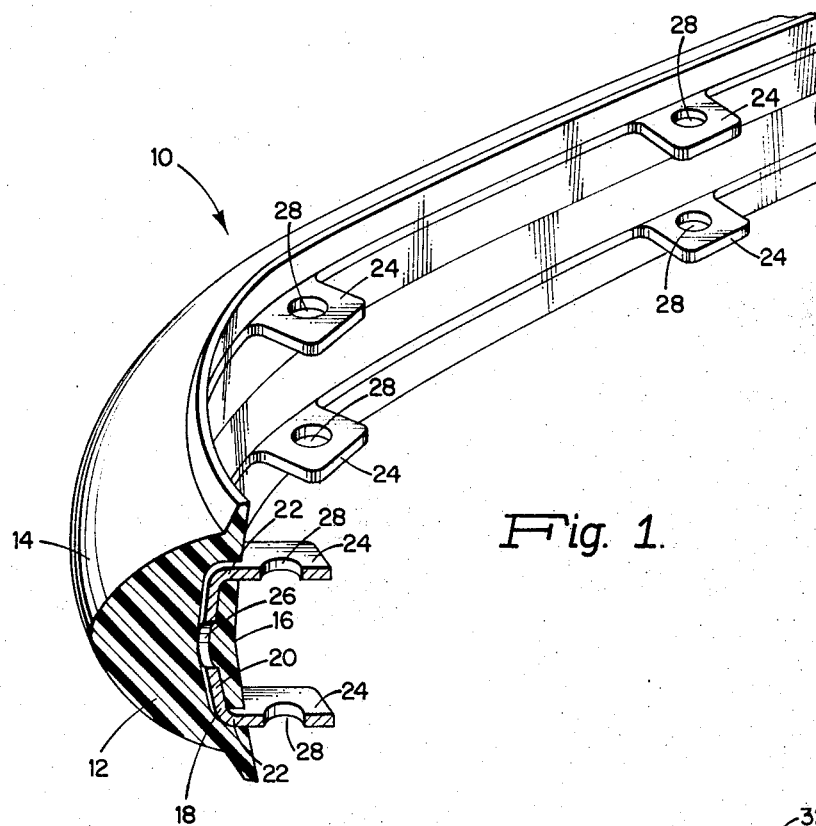
FIG. 1 is a perspective view, partially in section, of a protective device in the form of a bumper rub strip embodying the concepts of the present invention.
Figure 2:
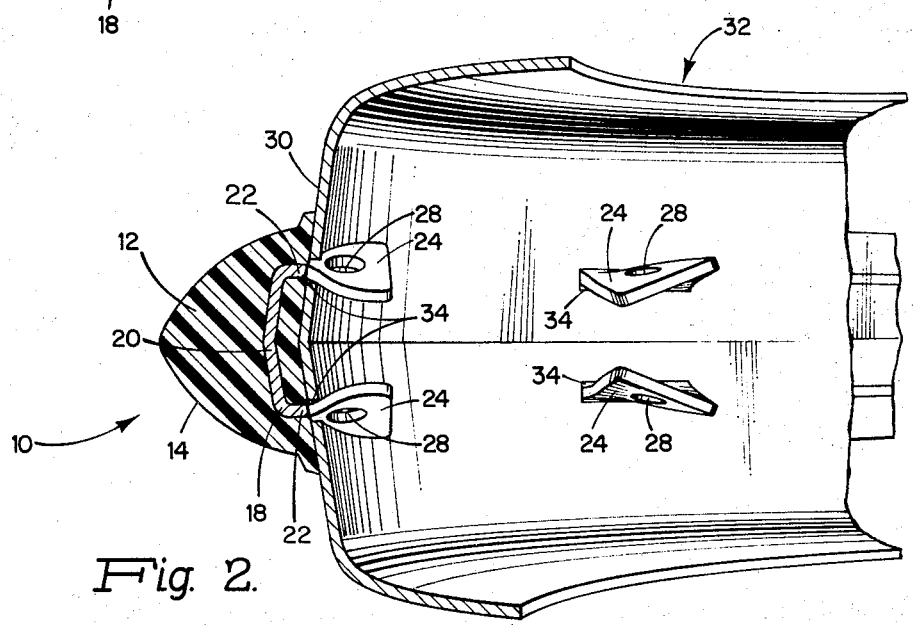
FIG. 2 is another perspective view, again partially in section, showing the rub strip of FIG. 1 attached to an automobile bumper; and, FIGS. 3 and 4 are sectional views taken through a typical production mold which may be employed to manufacture the rub-strip shown in FIGS. 1 and 2.

Referring more particularly to the drawings, there is shown in FIGS. 1 and 2, a protective device according to the present invention in the form of a "rub strip" generally indicated as 10. The rub strip includes a molded wear element or body 12 of some suitable material, such as for example high density microcellular foam, having an exterior surface 14 suitably contoured to provide an attractive appearance which blends with the overall design of the component to which it is to be ultimately attached, and a rear surface 16 which is contoured to fit snugly against the surface to be protected. The exterior surface 14 may be coated as by painting to match the decor of the sheet metal surfaces of the automobile. An attaching element generally indicated at 18 is embedded in the molded body 12 and forms an integral part of the rub strip assembly. Attaching element 18 is provided with a generally U-shaped cross section made up of an intermediate web section 20 and oppositely disposed laterally extending side flanges 22. The web section 20 and side flanges 22 are fully embedded in the molded body 12, with the web section 20 being spaced forwardly of rear surface 16.

The side flanges 20 are each additionally provided with longitudinally spaced integral ears 24 which protrude rearwardly through the rear surface 16 of the molded body 12. For reasons to be hereinafter specified, the web section 20 is preferably provided with longitudinally spaced apertures 26. Likewise, the rearwardly protruding ears 24 may also be provided with apertures 28.

FIG. 2 illustrates a typical use for the invention wherein the rub strip 10 is attached to the front surface 30 of an automobile bumper 32. The bumper is provided with appropriately spaced slots 34 through which the ears 24 protrude when the rear surface 16 of the molded body 12 is brought into contact with the front bumper surface 30. Thereafter, the ears 24 may be twisted as shown in the drawings, or otherwise bent or distorted to complete attachment of the rub strip to the bumper.

Figure 3:
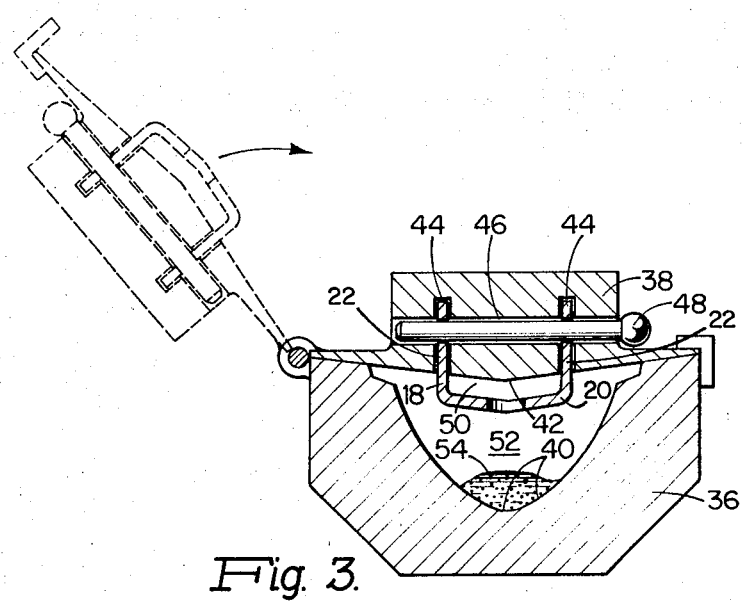
Figure 4:
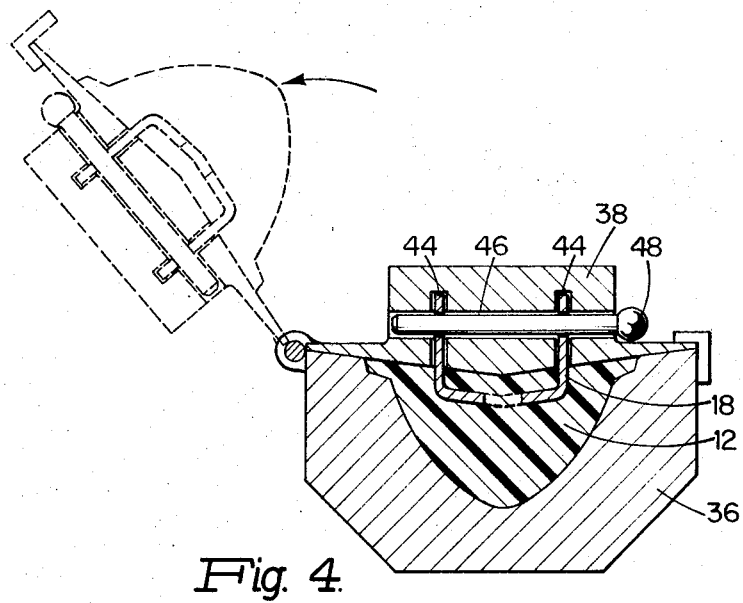

FIGS. 3 and 4 illustrate a typical apparatus which may be employed to produce the rub strip shown in FIGS. 1 and 2. The apparatus includes a base mold section 36 and a pivotal lid section 38. The interior contour 40 of the base section 36 defines the exterior surface 14 of the molded article. Likewise, the bottom surface 42 of the mold lid defines the rear surface 16 of the molded article.

The mold lid is additionally provided with a plurality of longitudinally and laterally spaced slots 44, and a plurality of spaced laterally extending passageways 46. The slots 44 are suitably spaced and dimensioned to receive the ears 24 on the attaching element 18, and the laterally extending passageways 46 cooperate with the apertures 28 in the ears 24 to accommodate insertion of pins 48 which serve to locate and attach element 18 to the mold lid 38. When the element 18 is thus attached to the mold lid, web section 20 is spaced from bottom surface 42, and accordingly, the web section in effect cooperates with the side flanges 22 and the bottom surface 42 to enclose a space 50. Once the mold lid is closed the apertures 26 in web section 20 connect space 50 with the remainder of the mold cavity 52.

During fabrication, the mold lid 38 is opened and the attaching element 18 secured thereto as shown in dotted in FIG. 3. Thereafter, and as shown by the solid lines in FIG. 3, the mold cavity 52 is charged with a predetermined amount of a foamable urethane composition 54 and the mold lid is then closed and secured in any known manner. As the foaming reaction takes place, the urethane composition expands and completely fills all unoccupied spaces of the mold cavity 52. The web apertures 26 permit the composition to expand upwardly into space 50, all as shown by the solid lines in FIG. 4. After the foaming and curing operation has been completed, the mold lid is opened as shown in dotted in FIG. 4. The molded unit is lifted out of the mold cavity by the upward pivotal motion of the lid, and the pins 48 are next removed to free the completed rub strip for removal from the mold assembly.

Having thus described one embodiment of a protective device embodying the concepts of the present invention, the advantages to be derived from its use will now become more apparent to those skilled in the art. Among these advantages is the provision of integral rearwardly protruding ears which may be twisted or otherwise deformed to secure the protective device to a given surface. No special tools are required to attach the device, and once attached, there is little is any likelihood that the device will subsequently loosen or rattle. The absence of separate nuts, clips, etc., further facilitates attachment. The channel-shaped attaching element adds strength and rigidity to the molded assembly, and the integral attaching ears 24 do not significantly increase the cost of the assembly, nor do they in any way weaken the strength of the attaching element. The side flanges 22 of the channel shaped attaching element 18 face rearwardly towards the surface 30 against which the device is secured, and thus in the event that the exterior surface 14 of the molded body 12 is contacted during impact, there is no possibility of the flanges cutting through the molded body. The ears 24 also operate during the molding operation to provide an effective means of locating the attaching element 18 in the mold cavity.

It will be appreciated that various modifications may be made to the invention as described above. Thus, for example, the molded body 12 may consist of a material other than microcellular urethane foam. The attaching element 18 may take on a different cross-sectional configuration to accommodate different molds. The number and/or configuration of the rearwardly protruding attaching ears may also be varied.

While the device illustrated herein in the drawings is intended to function as a rub strip for an automobile bumper, it will be understood that similar devices may be attached to a wide range of surfaces, the only requirement being the location of suitably spaced and dimensioned apertures or slots through which the attaching ears 24 may protrude.

It is my intention to cover all changes and modifications of the embodiment herein chosen for purposes of disclosure which do not depart from the spirit and scope of the invention.

I claim:

1. A device for protecting the exposed surface of an exterior component, such as for example an automobile bumper, said means comprising: an elongated wear element molded of a suitable energy absorbing material and having a rear surface suitably contoured for flush face-go-face contact with the exposed surface; and a longitudinally extending mounting element for securing said wear element to the said component, said mounting element having a generally channel-shaped cross-section with an intermediate web joining oppositely disposed laterally extending side flanges, each of said side flanges being further provided with integral longitudinally spaced ears, said intermediate web and said side flanges being embedded in said wear element with said attaching ears protruding rearwardly through said rear surface.

2. The device as claimed in claim 1 wherein said intermediate web is spaced from said rear surface and completely embedded within said energy absorbing material.

3. The device as claimed in claim 2 wherein said intermediate web is provided with a plurality of longitudinally spaced apertures.

4. The device as claimed in claim 1 wherein said attaching ears are each provided with apertures adapted to cooperate with locating pins which serve to temporarily attach the said mounting element to the mold during the molding of said device.

* * * * *